(12) United States Patent
Murata et al.

(10) Patent No.: US 7,283,304 B2
(45) Date of Patent: Oct. 16, 2007

(54) ANTIGLARE FILM

(75) Inventors: Makoto Murata, Shizuoka (JP); Kensaku Higashi, Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 108 days.

(21) Appl. No.: 10/556,129

(22) PCT Filed: Mar. 16, 2005

(86) PCT No.: PCT/JP2005/004613

§ 371 (c)(1),
(2), (4) Date: Nov. 9, 2005

(87) PCT Pub. No.: WO2005/093468

PCT Pub. Date: Oct. 6, 2005

(65) Prior Publication Data

US 2007/0076298 A1     Apr. 5, 2007

(30) Foreign Application Priority Data

Mar. 29, 2004  (JP) .............................. 2004-094560
Mar. 29, 2004  (JP) .............................. 2004-094561

(51) Int. Cl.
*G02B 13/20*    (2006.01)
*B32B 7/02*     (2006.01)

(52) U.S. Cl. ....................... 359/599; 359/601; 359/707; 428/212

(58) Field of Classification Search ................ 359/599, 359/707, 601–614; 428/212, 323
See application file for complete search history.

(56) References Cited

U.S. PATENT DOCUMENTS

| 5,559,202 | A  | * | 9/1996  | Yoshikawa ................... 526/207 |
| 6,184,300 | B1 | * | 2/2001  | Shimokawa et al. ........ 525/242 |
| 6,217,176 | B1 | * | 4/2001  | Maekawa .................... 359/601 |
| 6,572,961 | B1 | * | 6/2003  | Koyama et al. ............. 428/323 |
| 6,710,923 | B2 | * | 3/2004  | Ito .............................. 359/599 |
| 6,852,376 | B2 | * | 2/2005  | Chien et al. ................. 428/1.3 |
| 2006/0057344 | A1 | * | 3/2006 | Sakurai et al. .............. 428/212 |

FOREIGN PATENT DOCUMENTS

| JP | 05-162261 | | 6/1993 | |
| JP | 06-016851 | | 1/1994 | |
| JP | 07-181306 | | 7/1995 | |
| JP | 2000-039506 | | 2/2000 | |
| JP | 2003-004915 | | 1/2003 | |
| JP | 2003-090906 | | 3/2003 | |
| JP | 2005-189258 | * | 7/2005 | ................. 359/599 |
| WO | WO 01/70826 A1 | | 9/2001 | |

* cited by examiner

*Primary Examiner*—Thong Q Nguyen
(74) *Attorney, Agent, or Firm*—Knobbe, Martens, Olson & Bear LLP

(57) ABSTRACT

The antiglare film proposed by the present invention has a light-diffusing layer in which fine resin particles are dispersed in a clear resin phase, wherein the fine resin particles comprise at least spherical fine resin particles and bowl-shaped fine resin particles having a concaved section at the particle center, and wherein the refractive index $n_x$ of the clear resin phase and the refractive index $n_z$ of the bowl-shaped fine resin particle satisfy the relationship expressed by formula (1) below. The light-diffusing layer may be provided on one surface of a clear base, and the irregular surface of the light-diffusing layer should preferably have an average roughness Ra of 0.1 to 1.0 μm.

$$n_x - n_z \geq 0.03 \qquad (1)$$

19 Claims, 2 Drawing Sheets

ANTIGLARE FILM

This application is U.S. National Phase under 35 U.S.C. §371 of International Application PCT/JP2005/004613, filed Mar. 16, 2005, which claims priority to Japanese Patent Application No. 2004-094560, filed Mar. 29, 2004, and No. 2004-094561, filed Mar. 29, 2004. The International Application was not published under PCT Article 21(2) in English.

TECHNICAL FIELD

This invention relates to an antiglare film that can be used as a surface member of various lighting equipment and displays, and particularly to an antiglare film that prevents glare, blurry image, dazzling effect, and whitening of the screen due to scattered light on the screen surface, on liquid crystal displays, etc.

BACKGROUND TECHNOLOGY

Image display devices such as liquid crystal displays, plasma displays, cathode ray tubes (CRTs) and electroluminescences (ELs) (hereinafter collectively referred to as "displays") are being used in various fields such as TV and computer and their technologies are progressing rapidly. In particular, liquid crystal displays are enjoying remarkable growth as a thin, lightweight and versatile display medium for use with thin televisions (TVs), mobile phones, personal computers, digital cameras, personal digital assistants (PDAs) and various other devices.

When these displays are used in relatively bright locations such as outdoors and under fluorescent lamps, reflection of sunlight, fluorescent light and other external light on the display becomes a problem. As an antiglare treatment to prevent reflection of external light, generally irregularities are formed on the display surface to diffuse external light reflecting on the surface.

This antiglare treatment is embodied by means of roughening the display surface via sandblasting, etc., by means of coating the display surface with a clear resin and then forming a film having an irregular surface on top of the resin, or by means of coating the display surface with a coating material that consists of a resin binder and inorganic or organic clear fine particles dispersed in the binder, in order to provide an antiglare layer on the display surface.

Of these technologies, the last antiglare treatment using a resin binder and organic clear fine particles is currently used most widely, partly because external light can be effectively diffused by the irregularities comprised of fine particles and also by the differential refractive index between the resin binder and fine particles, and partly because this technology has the effect of widening the viewing angles—when used on liquid crystal displays that generally have a limited range of viewing angles because of their structure—by diffusing and emitting the image information output on the display at angles over a wider range. For example, this technology is presented in Patent Literatures 1 through 3.

Patent Literature 1: Specification of Patent No. 3314965
Patent Literature 2: Publication of Unexamined Patent Application No. Hei 5-162261
Patent Literature 3: Publication of Unexamined Patent Application No. Hei 7-181306

SUMMARY OF THE INVENTION

Problems to be Solved by the Invention

While they can suppress surface reflections, however, displays that are given the aforementioned antiglare treatment using a resin binder and organic clear fine particles do present problems of blurry image and dazzling effect caused by unnecessary diffusion of image information output on the display. In addition, these displays also cause the so-called "whitening" phenomenon in which the antiglare surface of the display looks whitish due to the effect of external light. Furthermore, in the case of a liquid crystal display, the antiglare treatment sometimes causes the viewing angle characteristics to deteriorate, in which case the contrast may drop and image may look faded when viewed from oblique directions.

The present invention was developed for the purpose of solving the aforementioned problems of prior technologies. Specifically, its purpose is to provide an antiglare film that can be favorably used to give an antiglare treatment for suppressing the occurrence of blurry image or dazzling effect or deterioration of viewing angle characteristics of liquid crystal displays.

MEANS FOR SOLVING THE PROBLEMS

After an extensive study to solve the above problems, the inventor discovered that the aforementioned purpose could be achieved by using spherical fine resin particles together with a combination of clear resin and bowl-shaped fine resin particles whose refractive indexes have a specific relationship, and utilized the findings to develop the present invention.

In other words, the antiglare film proposed by the present invention has a light-diffusing layer in which fine resin particles are dispersed in a clear resin phase, and is characterized in that these fine resin particles comprise at least spherical fine resin particles and bowl-shaped fine resin particles having a concaved section at the particle center, and that a refractive index $n_x$ of the clear resin phase and a refractive index $n_z$ of the bowl-shaped fine resin particle have the relationship expressed by formula (1) below:

$$n_x - n_z \geq 0.03 \quad (1)$$

In the aforementioned antiglare film proposed by the present invention, preferably, the refractive index $n_y$ of the spherical fine resin particle and the refractive index $n_z$ of the bowl-shaped fine resin particle satisfy the relationship expressed by formula (2) below:

$$n_z < n_y \quad (2)$$

Also in the aforementioned antiglare film proposed by the present invention, preferably, an average particle size $D_y$ of the spherical fine resin particles and an average particle size $D_z$ of the bowl-shaped fine resin particles are in a range of 0.3 μm to 7.0 μm, respectively, and it is also preferable that the average particle size $D_y$ of the spherical fine resin particles and the average particle size $D_z$ of the bowl-shaped fine resin particles have the relationship expressed by formula (3) below:

$$0.7\, D_z \leq D_y \leq 1.4\, D_z \quad (3)$$

In the antiglare film proposed by the present invention, preferably, the aforementioned light-diffusing layer is provided on at least one surface of a clear base.

Also, preferably, the aforementioned light-diffusing layer has a convex-concave surface, and convex parts of this convex-concave surface are formed by the convex sections of spherical fine resin particles and bowl-shaped fine resin particles. In this case, preferably, a thickness of the thinnest part of the light-diffusing layer is greater than the height of the aforementioned bowl-shaped fine resin particle. In addition, preferably, the average particle size of the aforementioned spherical fine resin particles is in a range of 110 to 300% of the height of the aforementioned bowl-shaped fine resin particle. Furthermore, preferably, an average roughness Ra of the aforementioned convex-concave surface is in a range of 0.1 to 1.0 μm.

DESCRIPTION OF THE SYMBOLS

Figure 1:
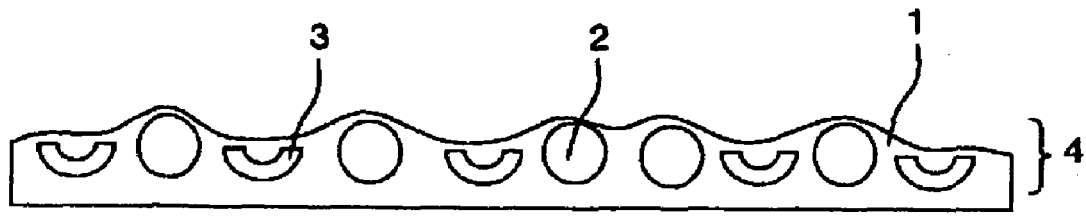
[FIG. 1] A section view showing an example of antiglare film conforming to the present invention.

1—Clear resin phase, 2—Spherical fine resin particle, 3—Bowl-shaped fine resin particle, 4—Light-diffusing layer, 5—Clear base, $D_z$—Average particle size, a—Bore diameter, b—Thickness, h—Height.

BEST MODE FOR CARRYING OUT THE INVENTION

The antiglare film proposed by the present invention uses spherical fine resin particles and bowl-shaped fine resin particles to provide the effect of widening the viewing angles of the display while suppressing blurry image. To be specific, the unique shape of the bowl-shaped fine resin particle provides a greater effect of limiting the diffusion of light to specific directions, compared with the spherical fine resin particle, and therefore the presence of bowl-shaped fine resin particles helps embody the effect of widening the viewing angles of the display while suppressing blurry image.

In general, a film given an antiglare treatment generates a dazzling effect because of local light intensity differences over the surface of the antiglare film, which in turn is caused by the surface irregularities of the antiglare film that are formed by fine particles and also caused by the lens effect of the interface between the clear resin phase and fine particle that respectively have a different refractive index. In the antiglare film proposed by the present invention, however, two types of interfaces are formed in the light-diffusing layer: an interface between the clear resin phase and spherical fine resin particle, and another between the clear resin phase and bowl-shaped fine resin particle. Of the two interfaces, the latter comprises components having the refractive index relationship specified in formula (1) above, and therefore cancels out the lens effects of both interfaces and thereby eliminates any dazzling effect. This also helps eliminate the dazzling effect caused by the surface irregularities of the antiglare film.

A film given an antiglare treatment also presents a problem of whitening if the surface irregularities of the antiglare film formed by fine particles are prominent. If the surface irregularities are too insignificant, the antiglare property, or the property to suppress reflection of external light, becomes insufficient. With the antiglare film proposed by the present invention, however, the convex parts of the convex-concave surface are formed by spherical fine resin particles alone or by a mixture of spherical fine resin particles and bowl-shaped fine resin particles. This unique surface irregularity design suppresses whitening of the surface, while adding an appropriate antiglare property to the surface.

In summary, the antiglare film proposed by the present invention can be used as a surface member of various lighting equipment and displays, and in particular it can be favorably used on image display devices such as liquid crystal displays, plasma displays, CRTs and ELs.

The mode of carrying out the antiglare film proposed by the present invention is explained by referring to the drawings.

Figure 2:
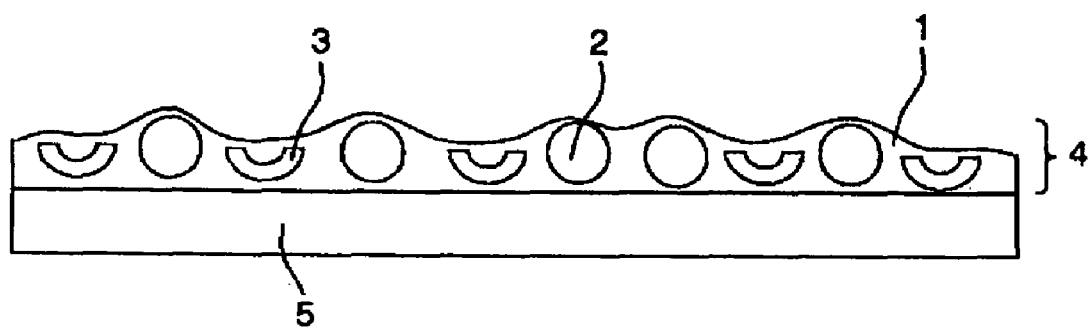
[FIG. 2] A section view showing another example of antiglare film conforming to the present invention.
Figure 3:
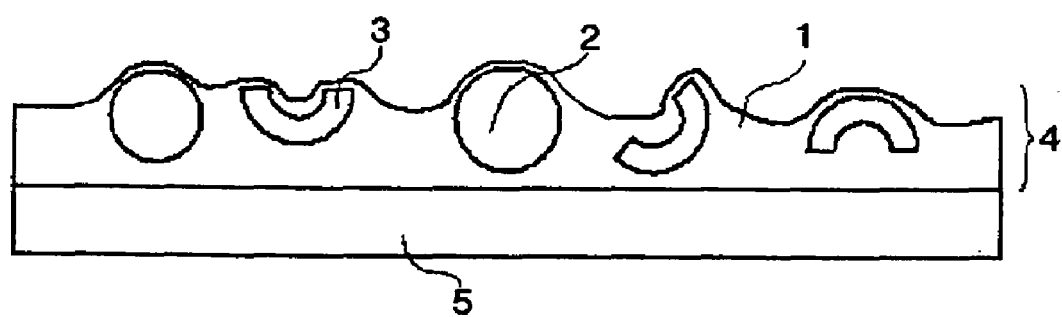
[FIG. 3] A section view showing yet another example of antiglare film conforming to the present invention.

FIG. 1 is a section view showing an example of antiglare film conforming to the present invention. The film comprises a light-diffusing layer (4) in which spherical fine resin particles (2) and bowl-shaped fine resin particles (3) are diffused in a clear resin phase (1), and spherical fine resin particles (2) form the convex parts of the irregular surface. FIG. 2 is a section view showing another example of antiglare film conforming to the present invention. Here, the light-diffusing layer (4) shown in FIG. 1 above is provided as a coating layer on top of a clear base (5) and the coating layer and clear base together form an antiglare film. FIG. 3 is a section view showing yet another example of antiglare film conforming to the present invention. Here, a light-diffusing layer (4) provided on top of a clear base (5) has bowl-shaped fine resin particles (3) dispersed in a clear resin layer (1) in irregular orientations, with the convex parts of the irregular surface formed by spherical fine resin particles (2) and bowl-shaped fine resin particles (3).

Various fine resin particles having different materials, shapes, particle sizes and other characteristics can be used in the antiglare film proposed by the present invention. Examples of materials for these fine resin particles include acrylic resin, silicone resin, styrene resin, melamine resin and styrene-acrylic copolymer resin, and any material can be selected freely based on the refractive indexes required by the light-diffusing layer, desired affinity with the binder material, and so on. Also, surface treatments using oils, silane-coupling agents, metal oxides and other organic or inorganic materials can also be provided for the purpose of improving the dispersion properties or controlling the refractive indexes.

In the present invention, some of the aforementioned fine resin particles must be spherical fine resin particles, while at least one portion of the remaining fine resin particles must be bowl-shaped fine resin particles having a concaved section at the center. In the present invention, a spherical fine resin particle means a particle having a spherical or near-spherical shape. As spherical fine resin particles, those produced from monomers using the suspension polymerization method or from a polymer solution using the spray-drying method can be used, among others.

Figure 4:
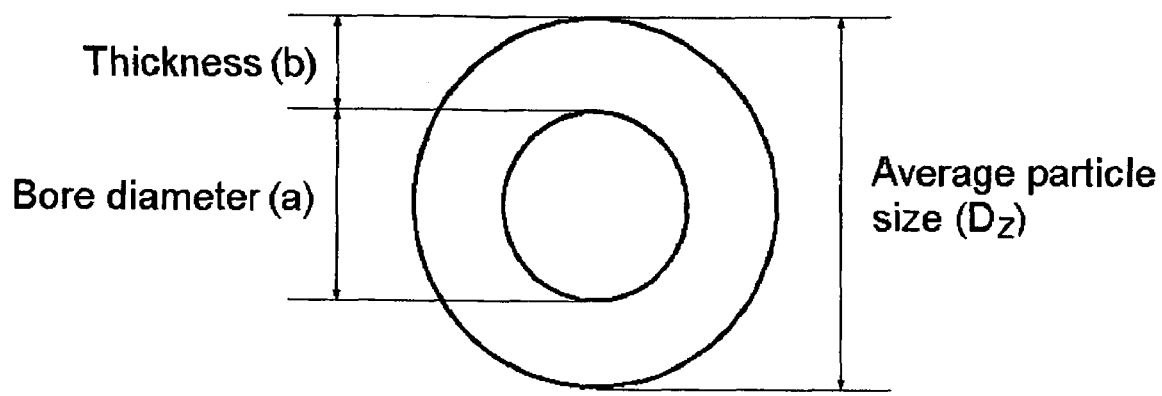
[FIG. 4] A top view of a bowl-shaped fine resin particle used by the present invention.
Figure 5:
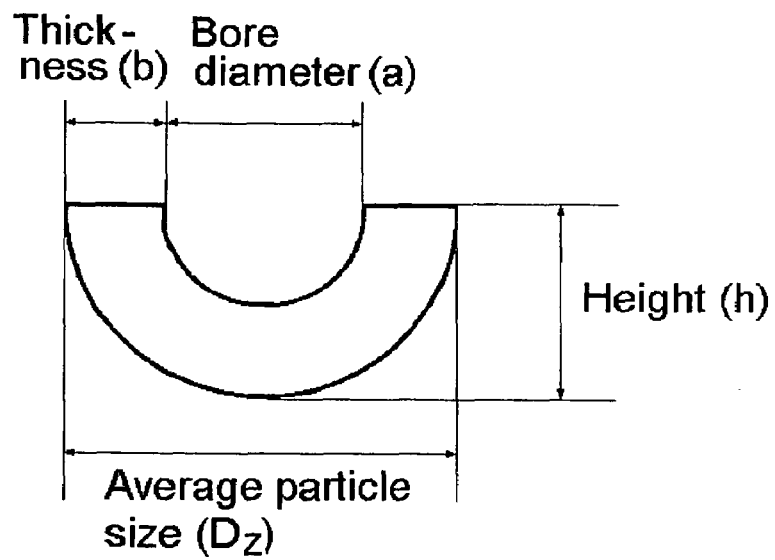
[FIG. 5] A side section view of a bowl-shaped fine resin particle used by the present invention.

As for bowl-shaped fine resin particles, there are no specific limitations and any fine resin particles having a concaved section like a bowl can be used. Typically, these particles have a shape illustrated in FIGS. 4 and 5. FIG. 4 is a top view of a bowl-shaped fine resin particle, while FIG. 5 is a side section view. In the present invention, the average particle size $D_z$, bore diameter a, thickness b and height h as shown in the figures should preferably have the relationships expressed by the formulas below:

$$0 < a < D_z, \text{ or more preferably } 0.2\ D_z < a < 0.8\ D_z$$

$$0 < b < 0.75\ D_z, \text{ or more preferably } 0.1\ D_z < b < 0.5\ D_z$$

$$0.1\ D_z < h < D_z, \text{ or more preferably } 0.25\ D_z < h < 0.75\ D_z$$

In the antiglare film proposed by the present invention, both the average particle size $D_y$ of the spherical fine resin particle and the average particle size $D_z$ of the bowl-shaped fine resin particle should preferably in a range of 0.3 to 7.0 μm. If these average particle sizes are smaller than 0.3 μm, they effectively become smaller than the wavelengths of visible lights and therefore are unable to provide a good light diffusion property. If the average particle sizes are greater than 7.0 μm, graininess of fine resin particles becomes apparent on the surface of the antiglare film, which is not desirable.

In addition, in the antiglare film proposed by the present invention the average particle size $D_y$ of the spherical fine resin particle should preferably be in a range of 110 to 300% of the height h of the bowl-shaped fine resin particle. If the average particle size $D_y$ is greater than 300% of the height h, the surface irregularities become prominent and whitening occurs. If $D_y$ is smaller than 110% of h, the irregularities become too insignificant and the antiglare property to suppress reflection of external light becomes insufficient. For your reference, the aforementioned particle shapes relating to the present invention are quantified by shape observation using an electron microscope.

Also, the total count of the aforementioned spherical fine resin particles and bowl-shaped fine resin particles contained in the antiglare film proposed by the present invention will vary depending on the particle sizes of the fine particles used and is not subject to any limitations. However, the total count should preferable be set to 60,000 particles/mm² or less, or more preferably to 40,000 particles/mm² or less, or most preferably in a range of 20,000 particles/mm² or less but 5,000 particles/mm² or more.

Additionally, there are no specific limitations as to the blending ratio of the aforementioned spherical fine resin particles and bowl-shaped fine resin particles contained in the antiglare film proposed by the present invention. However, the blending ratio of spherical fine resin particles and bowl-shaped fine resin particles, as expressed by numbers of particles, should preferably be in a range of 50/50 to 1/99, or most preferably in a range of 40/60 to 2/98.

In the antiglare film proposed by the present invention, the clear resin comprising the clear resin phase in which to disperse the aforementioned fine resin particles may be any of thermoplastic resins, thermosetting resins or radiation curable resins as deemed appropriate.

Examples of thermoplastic resins include polyethylene terephthalate (PET), polyethylene naphthalate (PEN), polymethyl methacrylate (PMMA), polycarbonate (PC), polyethylene (PE), polypropylene (PP), polyvinyl alcohol (PVA), polyvinyl chloride (PVC), cyclo-olefin copolymer (COC), norbornene-containing resin or polyether sulfone.

Examples of radiation curable resins include compositions that contain monomers, olygomers and/or prepolymers as deemed appropriate, where the monomers, olygomers and/or prepolymers contain acryloyl groups, methacryloyl groups, acryloyloxy groups, methacryloyloxy groups, epoxy groups, vinyl ether groups, oxetane groups and other polymeric unsaturated bonds or similar functional groups. Examples of monomers include methyl acrylate, methyl methacrylate, methoxy polyethylene methacrylate, cyclohexyl methacrylate, phenoxyethyl methacrylate, ethylene glycol dimethacrylate, dipentaerythritol hexaacrylate and trimethylol propane trimethacrylate. Examples of olygomers and prepolymers include polyester acrylate, polyurethane acrylate, epoxy acrylate, polyether acrylate, alkyd acrylate, melamine acrylate, silicone acrylate and other acrylate compounds; unsaturated polyester, tetramethylene glycol diglycidyl ether, propylene glycol diglycidyl ether, neopentyl glycol diglycidyl ether, bisphenol A diglycidyl ether, various alicyclic epoxys and other epoxy compounds; and 3-ethyl-3-hydroxymethyl oxetane, 1,4-bis {[(3-ethyl-3-oxetanyl) methoxy]methyl }benzene, di[1-ethyl (3-oxetanyl)]methyl ether and other oxetane compounds. These compounds can be used on their own or in any combination.

Examples of thermosetting resins include phenol resin, furan resin, xylene formaldehyde resin, ketone formaldehyde resin, urea resin, melamine resin, aniline resin, alkyd resin, unsaturated polyester resin and epoxy resin. These resins can be used on their own or in any combination.

The clear resin used in the antiglare film proposed by the present invention should have as high transparency as possible, and its light transmittance (JIS K-7105) should preferably be 80% or above, or more preferably be 90% or above. Although use of a clear resin with a light transmittance below 80% does not pose any problem in the application of the present invention, the display film becomes darker, which is not desirable.

To add various characteristics to the clear resin phase comprising one or more of the clear resins mentioned earlier, it is also possible to add reformers comprising nm-size fine particles that do not affect the light diffusion property. Examples of these reformers include silica, titanium dioxide, silicate sol, titanate sol, ITO and ATO.

The light-diffusing layer of the antiglare film proposed by the present invention can be formed by means of dissolving and dispersing in an appropriate solvent the aforementioned clear resin(s), spherical fine resin particles and bowl-shaped fine resin particles, and then coating the dispersion on an appropriate base, followed by drying and curing of the coated base. In the present invention, the light-diffusing layer can be separated from the base or formed as a coating layer on top of a clear base.

The thickness of the light-diffusing layer should preferably be in a range of 0.5 to 200 μm. If the light-diffusing layer is provided as a coating layer on top of a clear base, such light-diffusing layer is effectively supported by the clear base and therefore its thickness should preferably be in a range of 0.5 to 50 μm, or more preferably be in a range of 1 to 10 μm.

If the light-diffusing layer of the antiglare film proposed by the present invention is provided as a coating layer on top of a clear base, the clear base may be made of any known clear film, glass, etc. Specific examples of these materials that can be favorably used include various resin films made of polyethylene terephthalate (PET), polyethylene naphthalate (PEN), triacetyl cellulose (TAC), polymethyl methacrylate (PMMA), polycarbonate (PC), polyimide (PI), polyethylene (PE), polypropylene (PP), polyvinyl alcohol (PVA), polyvinyl chloride (PVC), cyclo-olefin copolymer (COC), norbornene-containing resin, polyether sulfone, cellophane and aromatic polyamide; or quartz glass, soda glass and other glass base materials. If the antiglare film proposed by the present invention is used on a plasma display or liquid crystal display, the clear base should preferably be made of PET, TAC, COC or norbornene-containing resin.

These clear bases should have as high transparency as possible, and their light transmittance (JIS K-7105) should preferably be 80% or above, or more preferably be 90% or above. Although use of a clear base with a light transmittance below 80% does not pose any problem in the application of the present invention, the display film becomes darker, which is not desirable.

The thickness of these clear bases is not subject to specific limitations, but it should preferably be in a range of 5 to 600 μm. When productivity is considered, use of a clear base with a thickness of 5 to 200 μm is particularly desirable.

In the antiglare film proposed by the present invention, the refractive index $n_x$ of the aforementioned clear resin and the refractive index $n_z$ of the bowl-shaped fine resin particle must have the relationship expressed by formula (1) mentioned earlier. To be specific, the light-diffusing layer of the antiglare film proposed by the present invention has two interfaces: an interface between the clear resin phase and spherical fine resin particle, and another between the clear resin phase and bowl-shaped fine resin particle. Of these interfaces, the interface between the clear resin phase and bowl-shaped fine resin particle can cancel out the lens effects of the two interfaces so that the dazzling effect eliminates, if the relationship expressed by formula (1) mentioned earlier is satisfied. The differential refractive index between the bowl-shaped fine resin particle with a lower refractive index and the clear resin phase must be 0.03 or more, as explained earlier. However, this differential refractive index should preferably be adjusted to 0.05 or more, or more preferably to 0.07 or more.

In the antiglare film proposed by the present invention, it is also desired that the refractive index $n_y$ of the spherical fine resin particle and the refractive index $n_z$ of the bowl-shaped fine resin particle satisfy the relationship expressed by formula (2) mentioned earlier. When these refractive indexes satisfy the relationship expressed by formula (2), whitening, blurry image and dazzling effect—problems that are seemingly caused by the relationships of shapes and refractive indexes of fine resin particles—can be suppressed, although the reason for this effect has not been revealed in details.

Also with respect to the antiglare film proposed by the present invention, it is desirable, in order to effectively prevent dazzling effect, that the average particle size of the aforementioned spherical fine resin particle be not much different from the average particle size of the aforementioned bowl-shaped fine resin particle. Specifically, the average particle size $D_y$ of the spherical fine resin particle and the average particle size $D_z$ of the bowl-shaped fine resin particle should preferably satisfy the relationship expressed by formula (3) mentioned earlier. In particular, the two average particle sizes should satisfy the following relationship:

$$0.8\ D_z \leq D_y \leq 1.2\ D_z$$

In the antiglare film proposed by the present invention, the light-diffusing layer should preferably have an irregular surface. Although the convex parts of the irregular surface may be formed by spherical fine resin particles alone, it is desirable that they be formed by a mixture of spherical fine resin particles and bowl-shaped fine resin particles. If the convex parts of the irregular surface are formed by a mixture of spherical fine resin particles and bowl-shaped fine resin particles, these convex parts are effectively formed by the spherical fine resin particles, by the convex sides, or semi-spherical parts, of bowl-shaped fine resin particles, as well as by the convex rings formed along the rims of concave parts provided on the concave sides of bowl-shaped fine resin particles. The shapes and numbers of these convex parts can be observed using a laser microscope or scanning electron microscope (SEM).

If the convex parts of the irregular surface are formed by a mixture of spherical fine resin particles and bowl-shaped fine resin particles, the total number of convex parts formed by the spherical fine resin particles and the semi-spherical parts of bowl-shaped fine resin particles should preferably be greater than the number of convex parts formed by the convex rings provided on the concave sides of bowl-shaped fine resin particles. In other words, an irregular surface that is mainly formed by the spherical fine resin particles and the semi-spherical parts of bowl-shaped fine resin particles, which are mixed with an appropriate level of convex parts formed by the convex rings provided on the concave sides of bowl-shaped fine resin particles, can suppress whitening while adding an appropriate antiglare property. If the ratio of convex parts formed by the convex rings on the concave sides of bowl-shaped fine resin particles increases, the ratio of relatively sharp apexes formed over the irregular surface of the light-diffusing layer also increases, and this enhances the antiglare property. However, whitening becomes more likely to occur.

In the antiglare film proposed by the present invention, the average roughness Ra of the irregular surface of the light-diffusing layer should preferably be in a range of 0.1 to 1.0 μm, or more preferably in a range of 0.1 to 0.5 μm. If the average roughness Ra is smaller than 0.1 μm, the surface irregularities become too insignificant and the antiglare property to suppress reflection of external light becomes insufficient. If Ra is greater than 1.0 μm, the irregularities become prominent and whitening occurs, which is not desirable, either.

In the present invention, the thickness of the thinnest part of the light-diffusing layer in the antiglare film should desirably be greater than the height (h) of the bowl-shaped fine resin particle. If the thickness of the thinnest part of the light-diffusing layer is smaller than the height of the bowl-shaped fine resin particle, all spherical fine resin particles and bowl-shaped fine resin particles dispersed in the clear resin phase become a part of the surface irregularities, which increases the degree of surface irregularity of the antiglare film and consequently causes whitening. Also, such dimensional relationship makes the surface irregularities of the antiglare film more geometrically complex, thus reducing the effect of suppressing blurry image.

In the following sections, the present invention is explained in more details by using examples. It should be noted, however, that the present invention is not limited to these examples. In the examples and comparative examples provided below, the term "part" refers to "part by weight."

EXAMPLE 1

As a clear resin, 100 parts of dipentaerythritol hexaacrylate having a refractive index of 1.51 ($n_x$) were mixed with 3 parts of 2-hydroxy-2-methyl propiophenone as a photoinitiator; 6 parts of spherical fine resin particles made of styrene resin having a refractive index of 1.59 ($n_y$) and average particle size of 3.0 μm ($D_y$) and 4 parts of bowl-shaped fine resin particles made of silicone resin having a refractive index of 1.42 ($n_z$), average particle size of 2.4 μm ($D_z$), height of 1.7 μm (h), bore diameter of 1.8 μm (a) and thickness of 0.35 μm (b), as fine resin particles; and 130 parts of methyl isobuthyl ketone as a solvent, and the constituents were dispersed for 30 minutes in a sand mill to obtain a coating material. The obtained coating material was applied using the reverse coating method on a clear base made of TAC having a film thickness of 80 μm and transmittance of 94%, after which the coated base was dried for 2 minutes at 100° C. and then irradiated with ultraviolet light using a 120-watt/cm concentrating high-pressure mercury lamp (irradiation distance 10 cm, irradiation time 30 seconds) to cure the coating film. Thus, an antiglare film having a light-diffusing layer of 3.2 μm in thickness and 0.18 in average roughness Ra was produced.

EXAMPLE 2

As a clear resin, 100 parts of acrylate resin of zirconium-containing ultraviolet (UV) curing type having a refractive index of 1.67 (product name: Kz7391, solid content 42%, manufactured by JSR) were mixed with 18 parts of dipentaerythritol hexaacrylate having a refractive index of 1.51 to obtain a clear resin solution having a refractive index in cured state of 1.60 ($n_x$) and solid content of 51%. Then, 100 parts of this clear resin solution ware mixed with 1 part of 2-hydroxy-2-methyl propiophenone as a photoinitiator; 3 parts of spherical fine resin particles made of styrene resin having a refractive index of 1.59 ($n_y$) and average particle size of 3.0 μm ($D_y$) and 2 parts of bowl-shaped fine resin particles made of silicone resin having a refractive index of 1.42 ($n_z$), average particle size of 2.4 μm ($D_z$), height of 1.7 μm (h), bore diameter of 1.8 μm (a) and thickness of 0.35 μm (b), as fine resin particles; and 80 parts of methyl isobuthyl ketone as a solvent, and the constituents were dispersed for 30 minutes in a sand mill to obtain a coating material. The obtained coating material was applied using the reverse coating method on a clear base made of TAC having a film thickness of 80 μm and transmittance of 94%, after which the coated base was dried for 2 minutes at 100° C. and then irradiated with ultraviolet light using a 120-watt/cm concentrating high-pressure mercury lamp (irradiation distance 10 cm, irradiation time 30 seconds) to cure the coating film and thus produce an antiglare film. When this antiglare film was observed using an electron microscope, the thickness of the antiglare layer was 3.2 μm at the thickest part and 2.2 μm at the thinnest part, and the convex parts of the irregular surface were formed by spherical fine resin particles. The average roughness Ra was 0.37 μm.

EXAMPLE 3

AAs a clear resin, 100 parts of dipentaerythritol hexaacrylate having a refractive index of 1.51 ($n_x$) were mixed with 3 parts of 2-hydroxy-2-methyl propiophenone as a photoinitiator; 6 parts of spherical fine resin particles made of PMMA resin having a refractive index of 1.49 ($n_y$) and average particle size of 3.0 μm ($D_y$) and 4 parts of bowl-shaped fine resin particles made of silicone resin having a refractive index of 1.42 ($n_z$), average particle size of 2.4 μm ($D_z$), height of 1.7 μm (h), bore diameter of 1.8 μm (a) and thickness of 0.35 μm (b), as fine resin particles; and 130 parts of methyl isobuthyl ketone as a solvent, and the constituents were dispersed for 30 minutes in a sand mill to obtain a coating material. The obtained coating material was applied using the reverse coating method on a clear base made of TAC having a film thickness of 80 μm and transmittance of 94%, after which the coated base was dried for 2 minutes at 100° C. and then irradiated with ultraviolet light using a 120-watt/cm concentrating high-pressure mercury lamp (irradiation distance 10 cm, irradiation time 30 seconds) to cure the coating film. Thus, an antiglare film having a light-diffusing layer of 3.2 μm in thickness and 0.12 in average roughness Ra was produced.

COMPARATIVE EXAMPLE 1

As a clear resin, 100 parts of dipentaerythritol hexaacrylate having a refractive index of 1.51 ($n_x$) were mixed with 3 parts of 2-hydroxy-2-methyl propiophenone as a photoinitiator; 6 parts of spherical fine resin particles made of styrene resin having a refractive index of 1.59 ($n_y$) and average particle size of 3.0 μm ($D_y$) and 4 parts of bowl-shaped fine resin particles made of styrene-acrylic resin having a refractive index of 1.53 ($n_z$), average particle size of 2.5 μm ($D_z$), height of 0.6 μm (h), bore diameter of 0.5 μm (a) and thickness of 0.40 μm (b), as fine resin particles; and 200 parts of methyl isobuthyl ketone as a solvent, and the constituents were dispersed for 30 minutes in a sand mill to obtain a coating material. The obtained coating material was applied using the reverse coating method on a clear base made of TAC having a film thickness of 80 μm and transmittance of 94%, after which the coated base was dried for 2 minutes at 100° C. and then irradiated with ultraviolet light using a 120-watt/cm concentrating high-pressure mercury lamp (irradiation distance 10 cm, irradiation time 30 seconds) to cure the coating film. Thus, an antiglare film having a light-diffusing layer of 3.2 μm in thickness and 0.20 in average roughness Ra was produced for comparison.

COMPARATIVE EXAMPLE 2

As a clear resin, 100 parts of dipentaerythritol hexaacrylate having a refractive index of 1.51 ($n_x$) were mixed with 3 parts of 2-hydroxy-2-methyl propiophenone as a photoinitiator; 4 parts of spherical fine resin particles made of styrene resin having a refractive index of 1.59 ($n_y$) and average particle size of 3.0 μm ($D_y$) and 4 parts of bowl-shaped fine resin particles made of acrylic resin having a refractive index of 1.49 ($n_z$), average particle size of 2.4 μm ($D_z$), height of 0.6 μm (h), bore diameter of 0.5 μm (a) and thickness of 0.35 μm (b), as fine resin particles; and 200 parts of methyl isobuthyl ketone as a solvent; and the constituents were dispersed for 30 minutes in a sand mill to obtain a coating material. The obtained coating material was applied using the reverse coating method on a clear base made of TAC having a film thickness of 80 μm and transmittance of 94%, after which the coated base was dried for 2 minutes at 100° C. and then irradiated with ultraviolet light using a 120-watt/cm concentrating high-pressure mercury lamp (irradiation distance 10 cm, irradiation time 30 seconds) to cure the coating film. Thus, an antiglare film having a light-diffusing layer of 3.5 μm in thickness and 0.09 in average roughness Ra was produced for comparison.

COMPARATIVE EXAMPLE 3

As a clear resin, 100 parts of dipentaerythritol hexaacrylate having a refractive index of 1.51 ($n_x$) were mixed with 3 parts of 2-hydroxy-2-methyl propiophenone as a photoinitiator; 6 parts of spherical fine resin particles made of styrene resin having a refractive index of 1.59 ($n_y$) and average particle size of 3.0 μm ($D_y$) and 4 parts of spherical fine resin particles made of silicone resin having a refractive index of 1.42 ($n_z$) and average particle size of 2.4 μm ($D_z$), as fine resin particles; and 130 parts of methyl isobuthyl ketone as a solvent, and the constituents were dispersed for 30 minutes in a sand mill to obtain a coating material. The obtained coating material was applied using the reverse coating method on a clear base made of TAC having a film thickness of 80 μm and transmittance of 94%, after which the coated base was dried for 2 minutes at 100° C. and then irradiated with ultraviolet light using a 120-watt/cm concentrating high-pressure mercury lamp (irradiation distance 10 cm, irradiation time 30 seconds) to cure the coating film. Thus, an antiglare film having a light-diffusing layer of 3.2 μm in thickness and 0.24 in average roughness Ra was produced for comparison.

COMPARATIVE EXAMPLE 4

As a clear resin, 100 parts of dipentaerythritol hexaacrylate having a refractive index of 1.51 ($n_x$) were mixed with 3 parts of 2-hydroxy-2-methyl propiophenone as a photoinitiator; 6 parts of spherical fine resin particles made of silicone resin having a refractive index of 1.42 ($n_y$) and average particle size of 3.0 μm ($D_y$) and 4 parts of bowl-shaped fine resin particles made of acrylic resin having a refractive index of 1.49 ($n_z$) and average particle size of 2.5 μm ($D_z$), as fine resin particles; and 130 parts of methyl isobuthyl ketone as a solvent, and the constituents were dispersed for 30 minutes in a sand mill to obtain a coating material. The obtained coating material was applied using the reverse coating method on a clear base made of TAC having a film thickness of 80 μm and transmittance of 94%, after which the coated base was dried for 2 minutes at 100° C. and then irradiated with ultraviolet light using a 120-watt/cm concentrating high-pressure mercury lamp (irradiation distance 10 cm, irradiation time 30 seconds) to cure the coating film. Thus, a light-diffusing medium having a light-diffusing layer of 3.2 μm in thickness and 0.18 in average roughness Ra was produced for comparison.

Next, the above examples and comparative examples were evaluated based on the methods specified below.

(Visual Evaluation)

The entire deflection panel of a commercially available high-definition liquid crystal monitor (LCD-A15UR with a screen size of 15 inches, resolution corresponding to UXGA and pixel pitch of 133PPI, manufactured by I-O Data Device) was replaced with a panel without antiglare film, and then the antiglare film obtained by each of the examples and comparative examples was placed on the surface. First, reflection of external light and whitening were observed without displaying any image. Then, a still image was displayed and blurriness of image, dazzling effect and viewing angle characteristics were observed.

In the evaluation of antiglare property, a fluorescent lamp was placed in front of the monitor in such a way that its light reflects on the screen, and the degree of reflection of the profile of the fluorescent lamp was observed.

In the evaluation of whitening, the screen was observed from the front without any fluorescent lamp reflecting on the screen, and the degree of darkness of the antiglare film was observed.

In the evaluation of blurriness of image, Microsoft's software application (Microsoft Windows (registered trademark)) was used to display numbers typed in MS Mincho style using a font size of 11 points, and the displayed numbers were observed at a distance of 50 cm from the screen to check if they were blurred.

In the evaluation of dazzling image, the screen was observed from 50 cm away to check if the image looked dazzling.

In the evaluation of viewing angle characteristics, how much the contrast of a specified color photo image as viewed from the front would decrease when the same image was viewed at a 45° angle was observed.

Table 1 lists the evaluation results. The symbols of evaluation standards indicated in Table 1 are as follows:

Antiglare property: A) No reflection is observed, C) Reflection is observed

Whitening: A) No whitening is observed, B) Slight whitening is observed, but it does not affect practical use, C) Notable whitening is observed Blurriness of image: A) Image is not blurred and clear, C) Image is blurred Dazzling effect: A) No dazzling effect is observed, B) Slight dazzling effect is observed, but it does not affect practical use, C) Notable dazzling effect is observed Viewing angle characteristics: A) Contrast hardly decreases, C) Contrast decreases notably

TABLE 1

| | Antiglare property | Whitening | Blurriness of image | Dazzling effect | Viewing angle characteristics |
|---|---|---|---|---|---|
| Example 1 | A | A | A | A | A |
| Example 2 | A | B | A | A | A |
| Example 3 | A | A | A | B | A |
| Comparative Example 1 | A | A | A | C | C |
| Comparative Example 2 | C | A | A | C | C |
| Comparative Example 3 | A | C | C | A | A |
| Comparative Example 4 | A | C | C | C | A |

As evident from Table 1, the antiglare films conforming to the present invention as provided in Examples 1, 2 and 3, wherein the refractive indexes of the clear resin and bowl-shaped fine resin particle satisfy the relationship expressed in formula (1) mentioned earlier, exhibited good results in terms of whitening, blurriness of image, dazzling effect and viewing angle characteristics. On the other hand, the antiglare film provided by Comparative Example 1 could not suppress dazzling effect and also presented poor viewing angle characteristics. The antiglare film provided by Comparative Example 2 presented poor antiglare property, notable dazzling effect and undesirable viewing angle characteristics, while the antiglare film provided by Comparative Example 4 could not suppress whitening, blurriness of image and dazzling effect. The antiglare film provided by Comparative Example 3, which used only spherical fine resin particles, could not suppress whitening and blurriness of image.

The invention claimed is:

1. An antiglare film having a light-diffusing layer in which fine resin particles are dispersed in a clear resin phase, characterized in that the fine resin particles comprise at least spherical fine resin particles and bowl-shaped fine resin particles each having a concaved section at its particle center, and a refractive index $n_x$ of the clear resin phase and a refractive index $n_z$ of each of the bowl-shaped fine resin particles satisfy the relationship expressed by formula (1) below:

$$n_x - n_z \leq 0.03 \tag{1}$$

2. The antiglare film as described in claim 1, characterized in that a refractive index $n_y$ of each of said spherical fine resin particles and the refractive index $n_z$ of each of said bowl-shaped fine resin particles satisfy the relationship expressed by formula (2) below:

$$n_z < n_y \quad (2).$$

3. The antiglare film as described in claim 1, characterized in that an average particle size $D_y$ of said spherical fine resin particles and an average particle size $D_z$ of said bowl-shaped fine resin particles are in a range of 0.3 to 7.0 μm, respectively.

4. The antiglare film as described in claim 3, characterized in that the average particle size $D_y$ of said spherical fine resin particles and the average particle size $D_z$ of said bowl-shaped fine resin particles satisfy the relationship expressed by formula (3) below:

$$0.7 D_z \leq D_y \leq 1.4 D_z \quad (3).$$

5. The antiglare film as described in claim 1, characterized in that an average particle size $D_y$ of said spherical fine resin particles and an average particle size $D_z$ of said bowl-shaped fine resin particles satisfy the relationship expressed by formula (3) below:

$$0.7 D_z \leq D_y \leq 1.4 D_z \quad (3).$$

6. The antiglare film as described in claim 1, characterized in that the light-diffusing layer is provided on at least one surface of a clear base.

7. The antiglare film as described in claim 1, characterized in that the light-diffusing layer has a convex-concave surface, and convex parts of said convex-concave surface are formed by the spherical fine resin particles alone or by a mixture of the spherical fine resin particles and the bowl-shaped fine resin particles.

8. The antiglare film as described in claim 7, characterized in that a thickness of the thinnest part of said light-diffusing layer is greater than a height of each of said bowl-shaped fine resin particles.

9. The antiglare film as described in claim 7, characterized in that an average particle size of said spherical fine resin particles is in a range of 110 to 300% of a height of each of said bowl-shaped fine resin particles.

10. The antiglare film as described in claim 7, characterized in that an average roughness Ra of said convex-concave surface is in a range of 0.1 to 1.0 μm.

11. An antiglare film comprising a light-diffusing layer comprising:

a clear resin phase;
fine resin particles dispersed in the clear resin phase, said fine resin particles comprised of at least (i) spherical fine resin particles and (ii) bowl-shaped fine resin particles each having a concaved central section at, wherein a refractive index $n_x$ of the clear resin phase and a refractive index $n_z$ of each of the bowl-shaped fine resin particles satisfy formula (1):

$$n_x - n_z \geq 0.03 \quad (1).$$

12. The antiglare film as claimed in claim 11, wherein a refractive index $n_y$ of each of said spherical fine resin particles and the refractive index $n_z$ of each of said bowl-shaped fine resin particles further satisfy formula (2):

$$n_z < n_y \quad (2).$$

13. The antiglare film as claimed in claim 11, wherein an average particle size $D_y$ of said spherical fine resin particles and an average particle size $D_z$ of said bowl-shaped fine resin particles are in a range of 0.3 to 7.0 μm, respectively.

14. The antiglare film as claimed in claim 11, wherein an average particle size $D_y$ of said spherical fine resin particles and an average particle size $D_z$ of said bowl-shaped fine resin particles satisfy formula (3):

$$0.7 D_z \leq D_y 1.4 D_z \quad (3).$$

15. The antiglare film as claimed in claim 11, wherein the light-diffusing layer has a surface having an average roughness Ra of 0.1 to 1.0 μm.

16. The antiglare film as claimed in claim 11, wherein a blending ratio of the spherical fine resin particles to the bowl-shaped fine resin particles, as expressed by numbers of particles, is in a range of 50/50 to 1/99.

17. The antiglare film as claimed in claim 11, wherein a total number of the spherical fine resin particles and the bowl-shaped fine resin particles is in a range of 5,000 particles/mm$^2$ to 60,000 particles/mm$^2$.

18. The antiglare film as claimed in claim 11, further comprising a transparent substrate on which the light-diffusing layer is formed.

19. The antiglare film as claimed in claim 18, wherein the light-diffusing layer has a thickness of 0.5 μm to 50 μm.

* * * * *